(12) United States Patent
Nakkabi et al.

(10) Patent No.: US 11,899,759 B2
(45) Date of Patent: Feb. 13, 2024

(54) SIDE-CHANNEL COMMUNICATION RECONCILIATION OF BIOMETRIC TIMING DATA FOR USER AUTHENTICATION DURING REMOTE DESKTOP SESSIONS

(71) Applicant: Plurilock Security Solutions Inc., Victoria (CA)

(72) Inventors: Youssef Nakkabi, Victoria (CA); Paulo Quinan, Victoria (CA); Jord Tanner, Sooke (CA); Ian Paterson, Victoria (CA)

(73) Assignee: PLURILOCK SECURITY SOLUTIONS INC., Victoria (CA)

( * ) Notice: Subject to any disclaimer, the term of this patent is extended or adjusted under 35 U.S.C. 154(b) by 289 days.

(21) Appl. No.: 17/505,169

(22) Filed: Oct. 19, 2021

(65) Prior Publication Data

US 2022/0164420 A1    May 26, 2022

Related U.S. Application Data

(60) Provisional application No. 63/118,331, filed on Nov. 25, 2020.

(51) Int. Cl.
*G06F 21/30* (2013.01)
*G06F 21/31* (2013.01)
*G06F 21/45* (2013.01)
*G06F 21/83* (2013.01)

(52) U.S. Cl.
CPC ............ *G06F 21/305* (2013.01); *G06F 21/31* (2013.01); *G06F 21/45* (2013.01); *G06F 21/83* (2013.01)

(58) Field of Classification Search
CPC ........ G06F 21/305; G06F 21/31; G06F 21/45; G06F 21/83; G06F 21/50; G06F 2221/2139
See application file for complete search history.

(56) References Cited

U.S. PATENT DOCUMENTS

| | | | |
|---|---|---|---|
| 8,560,457 | B2 | 10/2013 | Obrea et al. |
| 9,355,242 | B2 * | 5/2016 | Manipatruni ........... G06F 21/44 |
| 9,529,987 | B2 | 12/2016 | Deutschmann et al. |
| 9,887,995 | B2 | 2/2018 | Rotter et al. |

(Continued)

OTHER PUBLICATIONS

Shepherd, C. et al., "Towards Trusted Execution of Multi-Modal Continuous Authentication Schemes," SAC '17 Proceedings of the Symposium on Applied Computing, pp. 1444-1451, Apr. 2017.

(Continued)

*Primary Examiner* — Amie C. Lin
(74) *Attorney, Agent, or Firm* — Thompson Hine LLP

(57) ABSTRACT

Various implementations disclosed herein include devices, systems, and methods that authenticate user identities based on input/sensor data received from remote workstations and/or during remote communication sessions. The input/sensor data may correspond to timing and patterns from which user identities may be authenticated. Some implementations disclosed herein communicate input/sensor data in a way that preserves the timing and pattern information of the data and/or in a way that allows such information to be used for authentication in real-time. Some implementations enable continuous provision of input/sensor data and/or enable continuous authentication of user identities during remote communication sessions.

14 Claims, 4 Drawing Sheets

(56) References Cited

U.S. PATENT DOCUMENTS

| | | |
|---|---|---|
| 10,628,571 B2 | 4/2020 | Kursun et al. |
| 11,714,891 B1 * | 8/2023 | Cao .................... G06F 3/04842 |
| | | 726/7 |
| 2017/0109751 A1 | 4/2017 | Dunkelberger et al. |
| 2018/0041484 A1 * | 2/2018 | Gifford ................ H04L 9/0825 |
| 2019/0272361 A1 | 9/2019 | Kursun et al. |
| 2019/0394195 A1 * | 12/2019 | Chari ..................... H04L 63/08 |
| 2020/0050749 A1 | 2/2020 | Barboi |
| 2020/0287901 A1 | 9/2020 | Avetisov et al. |
| 2020/0329036 A1 | 10/2020 | Harding |

OTHER PUBLICATIONS

Bamasag, O.O. et al., "Towards Continuous Authentication in Internet of Things Based on Secret Sharing Scheme," WESS '15 Proceedings of the WESS '15 Workshop on Embedded Systems Security, Article No. 1, pp. 1-8, 2015.

* cited by examiner

SIDE-CHANNEL COMMUNICATION RECONCILIATION OF BIOMETRIC TIMING DATA FOR USER AUTHENTICATION DURING REMOTE DESKTOP SESSIONS

RELATED APPLICATIONS

This application claims the benefit of U.S. Provisional Application Ser. No. 63/118,331 filed Nov. 25, 2020 and entitled "USER AUTHENTICATION DURING REMOTE SESSIONS USING TIME-BASED DATA," which is incorporated herein in its entirety.

TECHNICAL FIELD

The present disclosure generally relates to authenticating users of electronic devices and, in particular to, systems, devices and methods for authenticating users to provide initial or continuing access to applications and content through such electronic devices.

BACKGROUND

Various techniques assess input and sensor data of users of electronic devices to authenticate the identities of those users. Existing techniques for authenticating user identities on remote workstations and/or during remote communications sessions may have various deficiencies.

SUMMARY

User authentication using time-based biometric data generally requires accurate timing data. On local machines, the required timing precision can be obtained given the low variability of the local input processing and transmission delay. However, in remote desktop environments, the timing data is not always maintained when the data is transmitted. For example, the timing data may be replaced by the timing of the re-emitted events in the remote machine. This process may introduce jitter, therefore reducing the accuracy of the authentication system.

Various implementations disclosed herein include devices, systems, and methods that authenticate user identities based on input/sensor data received from remote workstations and/or during remote communication sessions. The input/sensor data may correspond to timing and/or patterns from which the user identities may be authenticated. As examples, input data may include a time sequence of keystrokes that correspond to a particular user's typing pattern, a time sequence of mouse positions that correspond to a particular user's mouse use behavior, and/or data that corresponds to touchscreen events (x,y,z axis, pressure, duration). Some implementations disclosed herein communicate input/sensor data in a way that preserves the timing and pattern information of the data and/or in a way that allows such information to be used for authentication in real-time. Some implementations enable continuous provision of input/sensor data and/or enable continuous authentication of user identities during remote communication sessions.

Some implementations authenticate a user using time-based biometric data (e.g., input/sensor data) from a remote desktop environment in which timing data is not necessarily maintained during transmission. This may involve sending timing data over a side-channel directly or via a reflector service to a remote authentication agent (or external authentication server) that uses the timing data for initial and/or continuous authentication. In some implementations, complete data is sent via the side channel and the remote agent performs authentication based exclusively on the side-channel data. In other implementations, incomplete data (e.g., only timing data & metadata without sensitive keycode/coordinate data) is sent via the side-channel and the remote agent reconciles the main and side-channel data streams into a single stream for authentication.

Some implementations involve a method performed by a processor executing instructions stored in a non-transitory computer-readable medium. The method may be performed by a device such as an authentication server. The method involves receiving time-based user data (e.g., keystroke events, mouse movement events, touchscreen events, images, etc.) from a user device displaying a remote desktop environment. The user device uses user input or sensor data associated with a user action (e.g., typing, moving a mouse, gesturing, etc.) to generate the time-based user data and remote desktop environment data. The user device sends the remote desktop environment data via a first communication channel (e.g., connection between communicating devices) to a remote system providing the remote desktop environment, for example, as batch data. The user device also sends the time-based user data via a second communication channel for authentication. The second communication channel is a different communication connection than the first communication channel. The time-based user data may be received in real-time, e.g., being sent at or soon after the times at which the associated events occur at the user device.

The method authenticates an identity of the user based on the time-based user data and enables the initial and/or continued use of the user device based on authenticating of that identity. The authenticating may involve comparing a time-based characteristic exhibited by the time-based user data with the time-based characteristic in prior data associated with the user. As examples, the authenticating may involve comparing timing of sequences of keystrokes, comparing timing of mouse position events, and/or comparing timing of touchscreen events.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
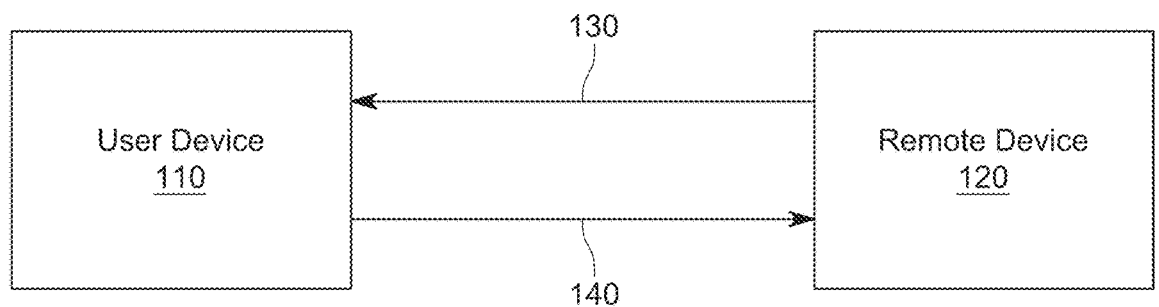
FIG. 1 illustrates exemplary electronic devices operating a remote desktop environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary electronic devices 110, 120 operating a remote desktop environment session (e.g., a virtual desktop session). In this example, remote device 120 provides a remote desktop environment on user device 110. For example, remote device 120 may provide content and data 130 that is displayed or otherwise provided on user device 110. Such content and data 130 may, for example, be used to provide a user interface of the remote desktop environment on user device 110. The user device 110 presents the remote desktop environment based on the content and data 130 received and sends content and data 140 back to the remote device 120. For example, such content and data 140 may be based on user input and/or sensor data received at user device 110 (e.g., providing input or data) to a user interface provided of the remote desktop environment.

Some implementations monitor a user device (e.g., user device 110) to confirm the identity of the user based on user input and/or sensor data. Some implementations facilitate initial and/or continuous authentication during remote desktop environment sessions based on such data. The user device 110 involved in such a session may include programs, agents, or other software configured to collect and send data in various forms, e.g., sending a set of events in a row and packaging those events into a packet for transit. In other implementations, a continuous session is kept open and data is sent in real-time (e.g., using a web-socket approach). In some implementations, data is hashed. For example, a keyboard character identifier may be hashed with a key (e.g., device, user, or dynamic). In some implementations, a batch-based communication channel is used for remote interactivity (e.g., a virtual desktop scheme that sends user input data in batches over the network).

In some implementations, a side-band communication channel separate from the main (e.g., batch) communication channel is used for user authentication. The side-band communication channel may be used for the transmission of input/sensor data between a remote workstation and a remote authentication agent. The use of a side-band communication channel may help preserve the timing/pattern elements within the data and/or facilitate fast, continuous, and/or real-time authentication. In some implementations, a virtual sideband is used to send data from workstation to a remote server. This may involve using a different network connection but sending along the same path from client to server. Some implementations use a reflector service (e.g., via WebRTC). This may involve using a virtual sideband and routing differently using the reflector service.

Figure 2:
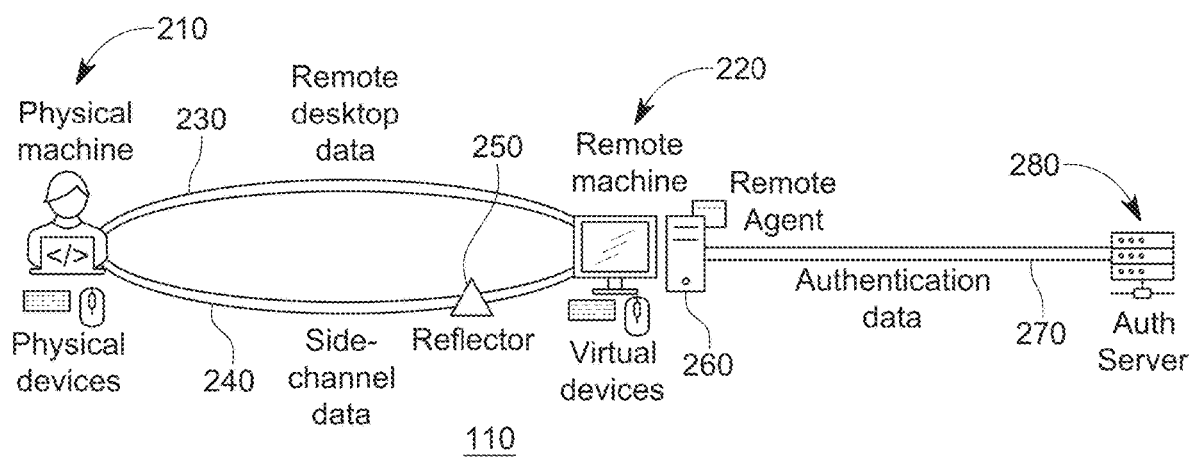
FIG. 2 illustrates another example of electronic devices operating a remote desktop environment, in accordance with some implementations.

Some implementations provide authentication components that are used in conjunction with (e.g., sit alongside) a remote desktop environment system. FIG. 2 illustrates an example of electronic devices operating a remote desktop environment and additional components used to facilitate user authentication. In this example, remote device 220 provides a remote desktop environment on user device 210 via an exchange of remote desktop data 230. In this example, the user device 210 is a physical machine that the user interacts with through physical devices or other input mechanisms and where the local data processor and the remote desktop client are running. The physical devices e.g., (input devices/sensors) may be any number or type of devices or sensors that generate data, e.g., keyboard, mouse, image sensors, audio sensors, touch screen sensors, etc. The remote desktop data 230 (RD data) may include data collected by the user device 210, for example, by a remote desktop client and sent to the remote device 220. The remote device 220 may be a remote machine upon which a remote desktop application and/or a remote authentication agent 260 are running. In some implementations, these applications are separated onto separate devices. In some implementations virtual devices are created by the remote desktop application to inject the incoming data into an operating system. For example, a virtual device may emit the events listened to by processes in the remote device 220, including the remote authentication agent 260.

User authentication is facilitated via a local data processor on user device 210, a remote authentication agent 260 on remote device 220, and, in some implementations, a reflector service 250 and/or an external authentication server 280. The local data processor on user device 210 collects data from the inputs/sensors of the local machine, filters the data that is not directed to the virtual desktop application, and sends side channel data 240 (S. Data) over a side-channel to the remote device 220. This transmission is performed either directly or via the reflector service 250. The remote authentication agent 260 performs remote authentication based on received data, e.g., based on received user biometric data. The remote authentication agent 260 may listen to the side-channel and continuously authenticate the user at the user device 210 by processing the side channel data 240 and/or remote desktop data 230 locally or in conjunction with an external authentication server 280. In some implementations, the remote authentication agent 260 performs user authentication itself. In some implementations, the remote authentication agent 260 sends authentication data 270 to an external authentication server 280, which performs user authentication and returns authentication results. The authentication data 270 compiled and sent from the authentication agent 260 to the external authentication server 280 may include reconciled and pre-processed data that is transmitted to the external authentication server 280 for final processing/authentication. The external authentication server 280 may perform final data processing and return a final authentication result. In some implementations, the external authentication server 280 is used only when the authentication agent 269 is not performing a fully offline authentication. The optional reflector 250 may be used to facilitate indirect communication when a direct one is not possible.

Some implementations monitor a remote device (e.g., user device 210) to confirm the identity of the user based on interpreting the received data continuously (e.g., on an ongoing basis as new data is received). This may involve caching and/or reordering packets that are received out of order subject to a fault tolerance. Encrypted data may be unencrypted as it is received. The data may be interpreted by, for example, comparing the data (e.g., event data) to a stored profile. The comparison may be limited. For example, the comparison may be limited to comparisons in the context of an open session. In some implementations, the comparison may compare the data to a stored profile using sliding window comparisons. In some implementations, a profile hierarchy is used and the comparison involve comparing the data against a stored profile based on the hierarchy.

White space may be incorporated between events to provide a way to identify when the user has left a workstation idle, which may facilitate easier detection of an imposter/attacker attempting to use the workstation following the idle period.

Some implementations facilitate identifying potential "Man in the Browser" (MitB) account takeovers on the user device side, which may be identified by looking at lag between input being displayed to the user, and the user taking action (e.g., the lag or delay in response would be a difference from a known good state/stored profile).

Example Modes of Operation

The following exemplary operation modes are provided to illustrate a few of the possible authentication operation modes. In the first operation mode, the local data processor collects and sends side channel data 240 including all relevant input/sensor data to the remote authentication agent 260, which performs authentication based exclusively on the side-channel data 240. In the second operation mode, the local data processor collects and sends less than all relevant data (e.g., only sending the timing information and certain additional metadata) via the side channel data 240. This may involve excluding some of the input/sensor data such as key code data, mouse/touch coordinate data, and/or other sensitive input/sensor data. The remote authentication agent 260 listens to its local input/sensor data and, with the help of the additional metadata, reconciles the two data streams (e.g., the remote desktop data 230 and the side-channel data) into a single data stream whose timing information is preserved regarding the local machine data.

The second operation mode may provide advantages over the first operation mode is some circumstances. For example, the second operation may be advantageous where there is potentially sensitive/private input/sensor data that should not be sent on both channels. Thus, the second operation mode may provide greater privacy and reducing the risk of exposure of sensitive information. The second operation mode may offer better guarantees that the remote device 220 processes data used for authentication and eliminates data duplication, reducing bandwidth usage.

Example Communication Methods

The communication between the local data processor of the user device 210 and the remote authentication agent 260 can occur in various ways involving direct and/or indirect communications. In some implementations, the communications involve direct communications in which the local data processor directly connects to the remote authentication agent 260 using any point-to-point (P2P) communication protocol like HTTP, WebRTC, Protobuf, etc., with or without employing a signaling server. In this case, both sides should mutually authenticate with each other. Direct communication can also be performed through a pre-established tunnel between the two machines or by leveraging the remote desktop application's 260 data channels if supported.

In some implementations, the communications involve indirect communication, for example, using a predefined reflector service or non-P2P protocol where the local data processor and remote authentication agent 260 open their connections with an intermediary server responsible for linking both sides and relaying the data from one side to the other. In this case, both sides only need to authenticate with the intermediary server and not necessarily to each other. Examples include using a TURN server or using a message broker like RabbitMQ.

Direct communication may be beneficial but may not be always possible depending on network topology on both sides, which may force the two sides into communicating indirectly using the reflector service. Also preferred is the use of a low-latency protocol when possible.

Example Reconciliation Processes

The remote authentication agent 260 may provide authentication based on one or both of the data streams (e.g., the remote device data 230 and the side-channel data 240). To do so, the remote authentication agent 260 may associate or reconcile two sets of data streams, e.g., matching aspects of the remote data stream 230 (e.g., the main keyboard/mouse/touch event streams generated, for example, by virtual devices) and the side-channel data 240 streams sent by the local data collector. Each stream of either set (e.g., the remote device data 230 and the side-channel data 240) may contain data of an individual device. These streams may be paired together based on the available device information such that one pair will hold data from the same device.

Each pair may be merged, for example, according to the following reconciliation algorithm:

1. Pop event (called_m_event) from the mainstream.
2. Calculate the difference (called_t_delta) between the previous m_event's original timestamp and the current m_event's original timestamp.
3. Calculate the matching time window center (called mtw_center) as the previous m_event's adjusted timestamp plus t_delta.
4. Set the matching time window as the range defined by mtw_center plus or minus the rolling average latency between the local and remote machines times six or a predefined minimum safe window size value, whichever is greater.
5. Iterate over side-channel stream until an event matches m_event according to metadata information or until the side-channel event's timestamp is outside the matching time window.
6. If there is a match:
   a. Set m_event's adjusted timestamp to the matched event's timestamp.
   b. Calculate the event latency as the difference between the original timestamp and the modified timestamp.
   c. Update the rolling average latency between the local and remote machines.
   d. Discard all the iterated side-channel events up to and including the matched event.

7. If there isn't a match:
   a. Set m_event's adjusted timestamp to mtw_center;
   b. Discard all side-channel events before the matching time window.
8. Return to step 1.

Figure 3:
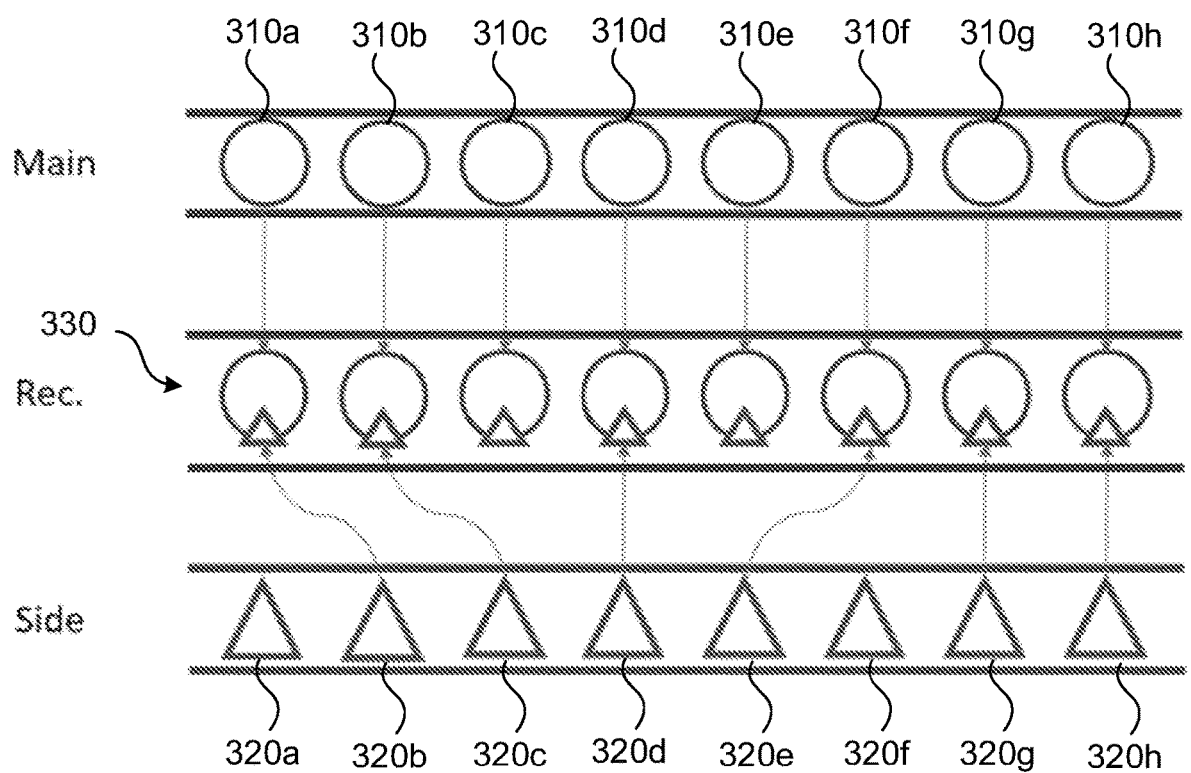
FIG. 3 illustrates reconciliation of main channel and side channel data for user authentication in accordance with some implementations.

FIG. 3 illustrates reconciliation of main channel and side channel data for user authentication. In this example, the main data (e.g., a stream of the remote device data 230) includes event data 310a-h and the side-channel data (e.g., a stream of side channel data 240) includes event data 320a-h. In this example, the reconciliation process produces a reconciled data stream 330 that includes event 310a matched with event 320b, event 310b matched with event 320c, event 310c not matched with any side channel event, event 310d matched with event 320d, event 310e not matched with any side channel event, event 310f matched with event 320e, event 310g matched with event 320g, and event 310h matched with event 320h.

The matching may result in adjusting timing data associated with the first data stream events based on matching them with events of the second data stream. Where an event of the main data stream matches an event in the side-channel data stream (e.g., the side channel data presumably having more accurate timing information), the time information from the side-channel event may be used instead of the timing data from the main channel. In the circumstance in which a main channel event does not match an event side-channel data, the main channel timing data may be used or information from related side-channel data may be used, e.g., using the average timing data for the side-channel events associated with the events immediately before and after the event. For example, timing data for event 310c may be based on the average of timing data of events 320c and 320d, which are associated with the events 310b and 310d on either side of event 310c. Timing distributions may be used based on prior data.

The technique may recognize circumstance in which data from multiple channels which should match does not match, e.g., based on detecting more than a threshold amount of differences in the data streams. Such detection may be used to determine circumstances in which the system is under attack, e.g., via a man in the middle type attack. In circumstances, where there are discrepancies, some implementations, use the main data channel to reduce the chances of a system attack compromising the authentication process.

The reconciliation may utilize additional data (e.g., metadata included in the side-channel data 240). Such additional data/metadata collected and used for matching may include various types of information useful in reconciliation. In one example, the data includes data associated with raw operating system events while excluding sensitive information like key code information and coordinates, e.g., device information like device type or device id, event type, e.g, keyup, keydown, mousemove and tap, modifier keys pressed, pressure.

Some implementations involve direct communication via an internet-facing HTTP server. This may involve the remote agent 260 starting an internet-facing HTTP server at a predefined port. Then, when a remote desktop session is started, the local data processor identifies the remote machine's IP address from the remote desktop connection and opens a connection to the remote HTTP server at the predefined port. Both sides have pre-configured authentication credentials that they use to authenticate to one another.

Some implementations involve direct communication via a localhost-only HTTP server and the RD tunnel. This may involve the remote agent 260 starting an HTTP server at a predefined port but binds it only to localhost. Then, when a remote desktop session is started, the local data processor leverages the opened remote desktop tunnel to open a connection to the remote HTTP server at the predefined port, which from the point of view of the remote agent 260, will be a local connection. Once again, both sides have pre-configured authentication credentials that they use to authenticate to one another.

Some implementations involve direct communication using WebRTC with SIP and STUN. This may involve both the local data processor and the remote agent 260 registering to a predefined STUN-enabled SIP server. The remote agent 260 is registered using its external IP address and port. Then, when a remote desktop session is started, the local data processor identifies the remote machine's IP address from the remote desktop connection and uses SIP as a signaling protocol to open a WebRTC connection to the remote agent. Once again, both sides have pre-configured authentication credentials to authenticate to the SIP server and one another.

Some implementations involve indirect communication using WebRTC and TURN. This may involve the remote agent 260 connecting to a predefined TURN server. Then, when a remote desktop session is started, the local data processor identifies the remote machine's IP address from the remote desktop connection and uses that information to open a WebRTC connection to the remote agent 260 via the TURN server. Both sides have pre-configured authentication credentials to authenticate to the TURN server and be authorized to exchange data between them.

Some implementations involve indirect communication via a message broker. This may involve the remote agent 260 connecting to a predefined message broker, such that it subscribes to a topic either derived from its external IP address and port or other remote session-related identifiers. Then, when a remote desktop session is started, the local data processor also connects to the same predefined message broken and registers itself to publish messages to the same topic as the remote agent 260, which it derives locally. Both sides have pre-configured authentication credentials to authenticate to the message broker and be authorized to publish or subscribe to that specific topic.

Example Authentication Method

Figure 4:
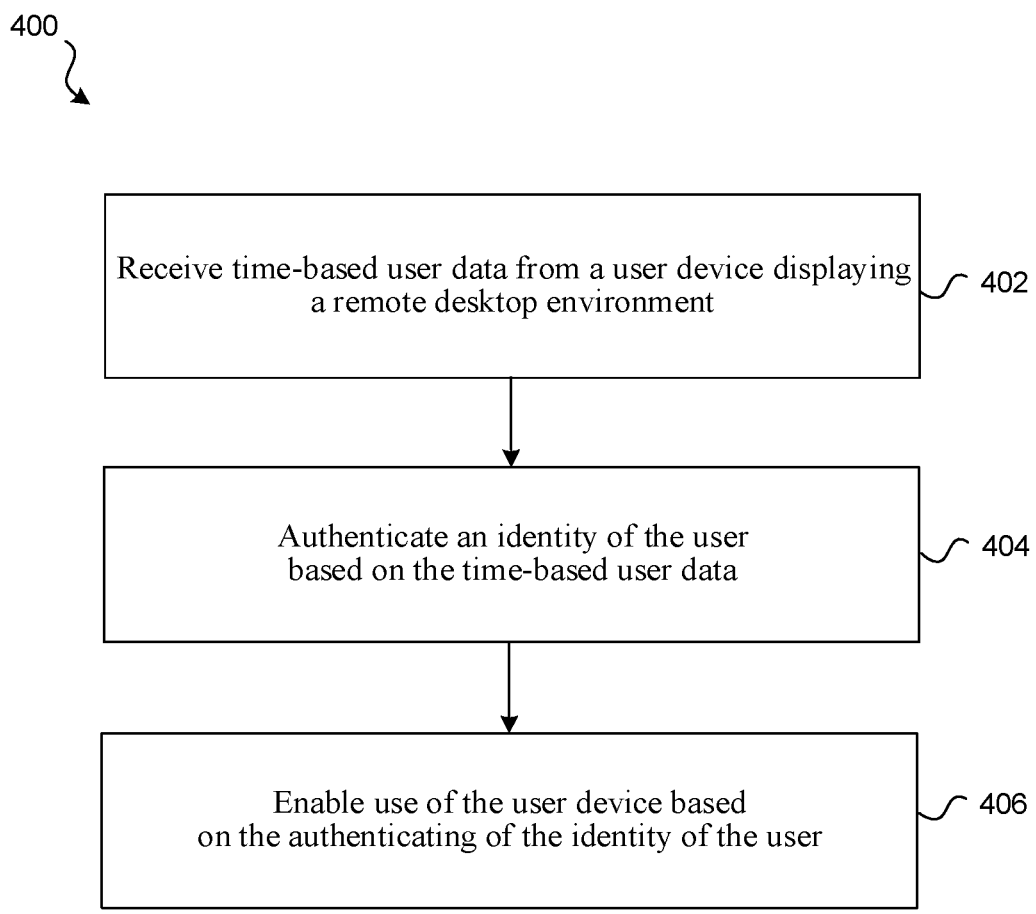
FIG. 4 is a flowchart illustrating a method for user authentication during provision of a remote desktop environment in accordance with some implementations.

FIG. 4 is a flowchart illustrating a method 400 for user authentication during provision of a remote desktop environment. In some implementations, a device such as electronic device 120, electronic device 220, or a combination of devices performs the steps of the method 400. In some implementations, method 400 is performed on a desktop or server device. The method 400 is performed by processing logic, including hardware, firmware, software, or a combination thereof. In some implementations, the method 400 is performed on a processor executing code stored in a non-transitory computer-readable medium (e.g., a memory).

At block 402, the method 400 receives time-based user data from a user device displaying a remote desktop environment. The user device uses user input or sensor data associated with a user action to generate the time-based user data and remote desktop environment data. Examples of user actions include, but are not limited to, depressing one or more keyboard keys, moving a mouse in one or more movements, and performing one or more gestures on a touchscreen or in space. The user device also sends the remote desktop environment data via a first communication channel to a remote system providing the remote desktop environment. The user device also sends the time-based user data via a second communication channel for authentication, where the second communication channel is different than the first communication channel.

At block 404, the method 400 authenticates an identity of the user based on the time-based user data. The authenticating involves comparing a time-based characteristic exhibited by the time-based user data with the time-based characteristic in prior data associated with the user. Authenticating the identity of the user may involve comparing timing of sequences of keystrokes, comparing timing of mouse position events, and/or comparing timing of user hand positions during hand gesturing. The identity of the user may be authenticated via an external server, e.g., as illustrated in examples described herein with respect external authentication server 280 of FIG. 2. The identity may be authenticated periodically and/or over time, for example, as addition data is received via one or more data streams.

In some implementations, the user device sends a data stream via the second communication channel, wherein the data stream comprises the time-based data and data associating the user action with content. The data stream may include all information about the user action, e.g., including key code data, coordinate data, and/or other sensitive/private data. The identity of the user is authenticated based on the time-based data and the data associating the user action with content from the data stream.

In some implementations, the user device sends a first data stream via the first communication channel, wherein the first data stream comprises data associating the user action with content (e.g., including key code data, coordinate data, and/or other sensitive/private data) and a second data stream via the second communication channel, wherein the second data stream comprises the time-based data and excludes the data associating the user action with content. (e.g., excluded key code data, coordinate data, and/or other sensitive/private data). The identity of the user is authenticated based on reconciling the first data stream with the second data stream. For example, the identity of the user may be authenticated based on adjusting timing data of the first data stream based on the time-based data of the second data stream.

At block 406, the method 400 enables use (e.g., initial and/or continued use) of the user device based on the authenticating of the identity of the user. For example, authorization or permission may be communicated back to the user on a periodic bases, e.g., every 0.1 seconds, every second, every 15 seconds, etc. In another example, the user device discontinues enabling use of the user device if it does not receive updated authorization from the remote authentication agent within a predetermined amount of time from receiving a prior authorization.

Figure 5:
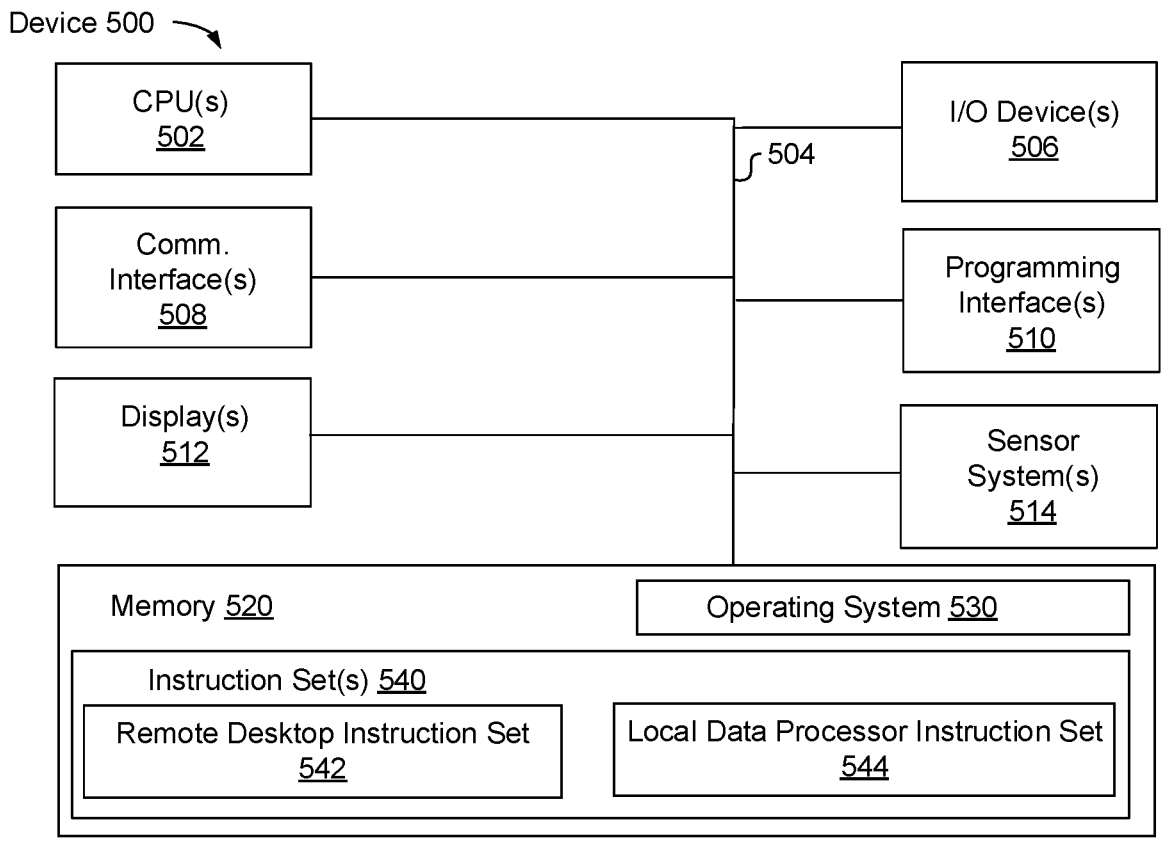
FIG. 5 is a block diagram of a user device of in accordance with some implementations.

FIG. 5 is a block diagram of a user device 500 of in accordance with some implementations. Device 500 illustrates an exemplary device configuration for electronic device 110 or electronic device 210. The device 500 includes one or more processing units 502 (e.g., microprocessors, ASICs, CPUs, processing cores, and/or the like), one or more input/output (I/O) devices 506, one or more communication interfaces 508 (e.g., USB, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 510, one or more display(s) 512, one or more sensor systems 514, a memory 520, and one or more communication buses 504 for interconnecting these and various other components. The one or more communication buses 504 interconnects and controls communications between system components. The one or more I/O devices 506 may include one or more mice, one or more keyboards, one or more trackpads, on or more touchscreens, one or more microphones, one or more speakers, a haptics engine, etc. The sensor systems 515 may include one or more image sensors, one or more motion sensors, one or more audio sensors, etc.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores an optional operating system 530 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein. The instruction set(s) 540 include remote desktop instruction set 542 configured to, upon execution, provide a remote desktop environment session as described herein. The instruction set(s) 540 further include a local data processor instruction set 544 configured to, upon execution, monitor events and send data used to authenticate the user to a remote authentication agent as described herein. The instruction set(s) 540 may be embodied as a single software executable or multiple software executables.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 6:
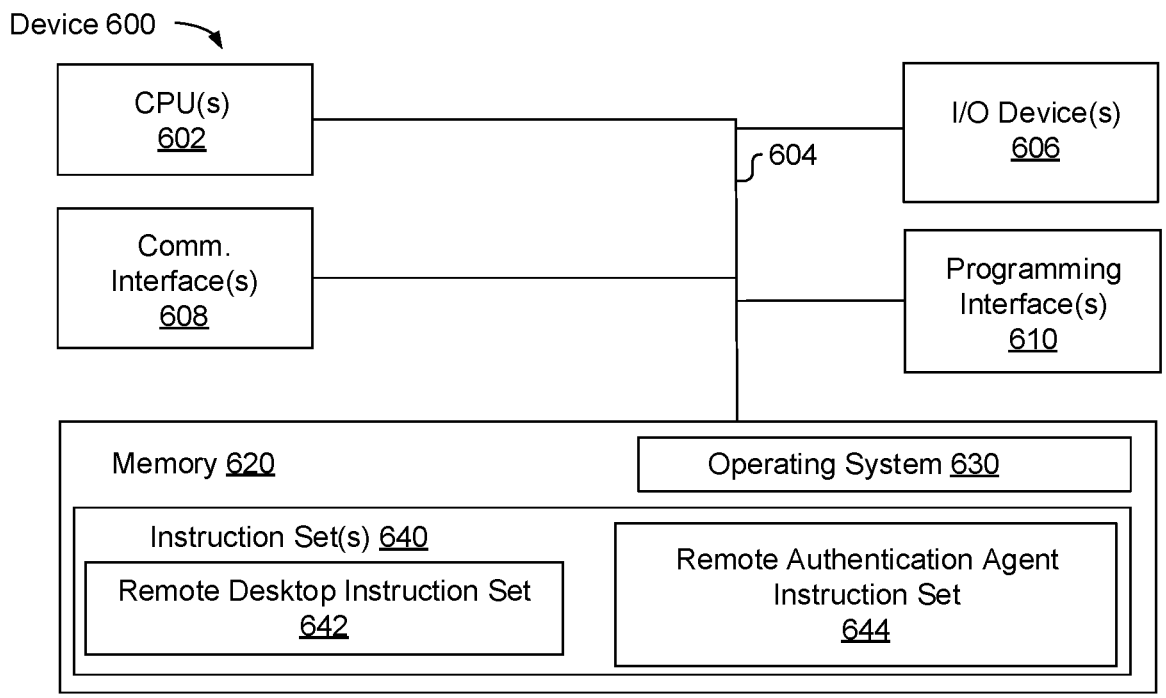
FIG. 6 is a block diagram of remote desktop and authentication device of in accordance with some implementations.

FIG. 6 is a block diagram of remote desktop and authentication device of in accordance with some implementations. Device 600 illustrates an exemplary device configuration for electronic device 120 or electronic device 220. The device 600 includes one or more processing units 602 (e.g., microprocessors, ASICs, CPUs, processing cores, and/or the like), one or more input/output (I/O) devices 606, one or more communication interfaces 608 (e.g., USB, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, a memory 620, and one or more communication buses 604 for interconnecting these and various other components.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein. The instruction set(s) 640 include remote desktop instruction set 642 configured to, upon execution, provide remote desktop environment sessions to one or more remote user devices as described herein. The instruction set(s) 640 further include a remote authentication agent instruction set 644 configured to, upon execution, authenticate a user (either itself or in communication with an external authentication server) based on one or more received data streams as described herein. The instruction set(s) 640 may be embodied as a single software executable or multiple software executables.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method comprising:
   at a processor,
      receiving time-based user data from a user device displaying a remote desktop environment, the user device using user input or sensor data associated with a user action to generate the time-based user data and remote desktop environment data, wherein the user device sends the remote desktop environment data via a first communication channel to a remote system providing the remote desktop environment and the user device sends the time-based user data via a second communication channel for authentication, the second communication channel different than the first communication channel, and wherein the user action is: depressing one or more keyboard keys, moving a mouse in one or more movements, or performing one or more gestures on a touchscreen or in space;
      authenticating an identity of the user based on the time-based user data, wherein the authenticating comprises comparing a time-based characteristic exhibited by the time-based user data with the time-based characteristic in prior data associated with the user, and wherein the authenticating of the identity of the user comprises comparing timing of sequences of keystrokes, comparing timing of mouse position events, or comparing timing of touchscreen events; and
      enabling use of the user device based on the authenticating of the identity of the user.

2. The method of claim 1, wherein the user device sends a data stream via the second communication channel, wherein the data stream comprises the time-based data and data associating the user action with content.

3. The method of claim 2, wherein the identity of the user is authenticated based on the time-based data and the data associating the user action with content from the data stream.

4. The method of claim 1, wherein the user device sends:
   a first data stream via the first communication channel, wherein the first data stream comprises data associating the user action with content;
   a second data stream via the second communication channel, wherein the second data stream comprises the time-based data and excludes the data associating the user action with content.

5. The method of claim 4, wherein the identity of the user is authenticated based on reconciling the first data stream with the second data stream.

6. The method of claim 4, wherein the identity of the user is authenticated based on adjusting timing data of the first data stream based on the time-based data of the second data stream.

7. The method of claim 1, wherein the identity is authenticated by accessing an external authentication server.

8. The method of claim 1 further comprising repeatedly authenticating the identity of the user over time.

9. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      receiving time-based user data from a user device displaying a remote desktop environment, the user device using user input or sensor data associated with a user action to generate the time-based user data and remote desktop environment data, wherein the user device sends the remote desktop environment data via a first communication channel to a remote system providing the remote desktop environment and the user device sends the time-based user data via a second communication channel for authentication, the second communication channel different than the first communication channel, and wherein the user action is: depressing one or more keyboard keys, moving a mouse in one or more movements, or performing one or more gestures on a touchscreen or in space;
      authenticating an identity of the user based on the time-based user data, wherein the authenticating comprises comparing a time-based characteristic exhibited by the time-based user data with the time-based characteristic in prior data associated with the user, and wherein the authenticating of the identity of the user comprises comparing timing of sequences of keystrokes, comparing timing of mouse position events, or comparing timing of touchscreen events; and
      enabling use of the user device based on the authenticating of the identity of the user.

10. The system of claim 9, wherein
    the user device sends a data stream via the second communication channel, wherein the data stream comprises the time-based data and data associating the user action with content; and
    the identity of the user is authenticated based on the time-based data and the data associating the user action with content from the data stream.

11. The system of claim 10, wherein the user device sends:
    a first data stream via the first communication channel, wherein the first data stream comprises data associating the user action with content;
    a second data stream via the second communication channel, wherein the second data stream comprises the time-based data and excludes the data associating the user action with content.

12. The system of claim 11, wherein the identity of the user is authenticated based on reconciling the first data stream with the second data stream.

13. The system of claim 11, wherein the identity of the user is authenticated based on adjusting timing data of the first data stream based on the time-based data of the second data stream.

14. A non-transitory computer-readable storage medium, storing instructions that, when executed by one or more processors, cause the one or more processors to perform operations comprising:
    receiving time-based user data from a user device displaying a remote desktop environment, the user device using user input or sensor data associated with a user action to generate the time-based user data and remote desktop environment data, wherein the user device sends the remote desktop environment data via a first communication channel to a remote system providing the remote desktop environment and the user device sends the time-based user data via a second communication channel for authentication, the second communication channel different than the first communication channel, and wherein the user action is: depressing one or more keyboard keys, moving a mouse in one or more movements, or performing one or more gestures on a touchscreen or in space;

authenticating an identity of the user based on the time-based user data, wherein the authenticating comprises comparing a time-based characteristic exhibited by the time-based user data with the time-based characteristic in prior data associated with the user, and wherein the authenticating of the identity of the user comprises comparing timing of sequences of keystrokes, comparing timing of mouse position events, or comparing timing of touchscreen events; and enabling use of the user device based on the authenticating of the identity of the user.

\* \* \* \* \*